United States Patent
Garcia Crespo et al.

(10) Patent No.: US 11,209,840 B2
(45) Date of Patent: Dec. 28, 2021

(54) WASHER FLUID SYSTEM AND DELIVERY METHOD

(71) Applicant: Ford Global Technologies, LLC, Dearborn, MI (US)

(72) Inventors: Jose Garcia Crespo, Bloomfield Township, MI (US); Paul Kenneth Dellock, Northville, MI (US); Stuart C. Salter, White Lake, MI (US); David Brian Glickman, Southfield, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 16/678,621

(22) Filed: Nov. 8, 2019

(65) Prior Publication Data

US 2021/0141401 A1  May 13, 2021

(51) Int. Cl.
*G05D 9/00* (2006.01)
*B60S 1/50* (2006.01)

(52) U.S. Cl.
CPC . *G05D 9/00* (2013.01); *B60S 1/50* (2013.01)

(58) Field of Classification Search
CPC ........ G05D 7/0146; G05D 7/016; G05D 9/00; G05D 9/02; Y10T 137/2911; Y10T 137/3021; Y10T 137/85986; Y10T 137/7323; Y10T 137/7404; Y10T 137/7436; Y10T 137/2795; B60S 1/481; B60S 1/50
See application file for complete search history.

(56) References Cited

U.S. PATENT DOCUMENTS

| | | | | |
|---|---|---|---|---|
| 3,822,715 A | * | 7/1974 | Rao | E02B 13/02 137/140 |
| 4,331,295 A | * | 5/1982 | Warihashi | B60S 1/52 239/284.1 |
| 5,779,096 A | * | 7/1998 | Cockfield | B60S 1/50 116/227 |
| 6,732,953 B2 | * | 5/2004 | Krause | B01F 15/00175 15/250.01 |

(Continued)

FOREIGN PATENT DOCUMENTS

| | | | | |
|---|---|---|---|---|
| AU | 2017203844 A1 | | 1/2019 | |
| JP | 07267053 A | * | 10/1995 | ............... B60S 1/50 |

(Continued)

*Primary Examiner* — Hailey K. Do
(74) *Attorney, Agent, or Firm* — David Coppielle, Esq.; Carlson, Gaskey & Olds, P.C.

(57) ABSTRACT

A washer fluid delivery system includes a washer fluid reservoir having a first zone with a first low point and a second zone with a second low point. A first valve is disposed in the first zone. The first valve is moveable back and forth between a flow permitting position and a flow restricting position in response to an amount of washer fluid within the first zone. A second valve is disposed in the second zone. The second valve is moveable back and forth between a flow permitting position and a flow restricting position in response to an amount of washer fluid within the second zone. A pump operates to draw a washer fluid from the first zone when the first valve is in the flow permitting position, and to draw a washer fluid from the second zone when the second valve is in the flow permitting position.

18 Claims, 2 Drawing Sheets

(56) References Cited

U.S. PATENT DOCUMENTS

| | | | |
|---|---|---|---|
| 8,955,545 B2* | 2/2015 | Murabayashi | F02M 37/025 137/565.11 |
| 2003/0075207 A1* | 4/2003 | Fukushima | B60S 1/50 134/123 |
| 2007/0017559 A1* | 1/2007 | Yamaguchi | B60S 1/50 134/123 |
| 2013/0206266 A1 | 8/2013 | Stenhouse | |
| 2016/0363025 A1* | 12/2016 | Karsch | B60K 11/02 |

FOREIGN PATENT DOCUMENTS

| | | | | |
|---|---|---|---|---|
| JP | 2003252043 A | * | 9/2003 | |
| JP | 2003252043 A | | 9/2003 | |
| WO | WO-9937515 A2 | * | 7/1999 | B60S 1/50 |

* cited by examiner

WASHER FLUID SYSTEM AND DELIVERY METHOD

TECHNICAL FIELD

This disclosure relates generally to a washer fluid system for a vehicle and, more particularly, to a washer fluid system utilized in connection with a washer fluid reservoir having more than one low point.

BACKGROUND

Vehicles can include washer fluid systems used to deliver washer fluid to clean various areas of the vehicles, such as cameras and sensors. A prior art washer fluid reservoir R is shown in FIG. 1. The prior art washer fluid reservoir R substantially includes a single zone have a single low point where fluid collects as a supply of washer fluid within the prior art washer fluid reservoir R is depleted.

SUMMARY

A washer fluid delivery system according to an exemplary aspect of the present disclosure includes, among other things, a washer fluid reservoir having a first zone with a first low point and a second zone with a second low point. A first valve is disposed in the first zone. The first valve is moveable back and forth between a flow permitting position and a flow restricting position in response to an amount of washer fluid within the first zone. A second valve is disposed in the second zone. The second valve moveable back and forth between a flow permitting position and a flow restricting position in response to an amount of washer fluid within the second zone. A pump operates to draw a washer fluid from the first zone through the first valve when the first valve is in the flow permitting position, and to draw a washer fluid from the second zone through the second valve when the second valve is the flow permitting position.

In another example of the foregoing delivery system, the washer fluid in the first zone is fluidly coupled to washer fluid in the second zone when the washer fluid reservoir has a first amount of washer fluid, and the washer fluid in the first zone is fluidly decoupled from washer fluid in the second zone when the washer fluid has a second amount of washer fluid that is less than the first amount of washer fluid.

In another example of any of the foregoing delivery systems, the first valve is a first shutoff valve, and the second valve is a second shutoff valve.

In another example any of the foregoing delivery systems, the first valve in the flow permitting position permits a flow of the washer fluid through the first valve, and the first valve in the flow restricting position restricts a flow of air through the first valve. The second valve in the flow permitting position permits a flow of the washer fluid through the second valve, and the second valve in the flow restricting position restricts a flow of air through the second valve.

Another example of any of the foregoing delivery systems includes a vehicle. The first zone extends to a position that is forward a wheel well of a vehicle and the second zone extends to a position that is aft a wheel well of the vehicle.

In another example of any of the foregoing delivery systems, the pump is disposed within washer fluid reservoir.

Another example of any of the foregoing delivery systems includes a bridging zone of the washer fluid reservoir. The bridging zone fluidly couples the first zone and the second zone when the washer fluid reservoir has an amount of washer fluid greater than a threshold amount.

In another example of the foregoing delivery systems, the first low point of the first zone, and the second low point of the second zone both extend vertically beneath a low point of the bridging zone.

Another example of any of the foregoing delivery systems includes a vehicle. The first zone is forward a wheel well of a vehicle and the second zone is aft a wheel well of the vehicle. The bridging zone is vertically above the wheel well.

In another example of any of the foregoing delivery systems, the pump is disposed within the bridging zone.

In another example of any of the foregoing delivery systems, the first valve is configured to float in washer fluid within the first zone, and the second valve is configured to float in washer fluid within the second zone.

In another example of any of the foregoing delivery systems, a first hose connects the first valve to the pump, and a second hose connects the second valve to the pump.

In another example of any of the foregoing delivery systems, the first valve includes a first floatable member that permits flow of washer fluid through the first valve to the first hose when a first amount of washer fluid is held within the first zone. The first floatable member restricts a flow of washer fluid through the first valve to the first hose when a second amount of washer fluid is held within the first zone. The first amount is greater than the second amount.

A washer fluid delivery method according to another exemplary non-limiting embodiment of the present disclosure includes, among other things, pumping washer fluid from a first zone of a washer fluid reservoir when a level of washer fluid within the first zone is above a first zone threshold, and restricting the pumping from the first zone when the level of washer fluid within the first zone is below the first zone threshold. The method further includes pumping washer fluid from a second zone of the washer fluid reservoir when a level of washer fluid within the second zone is above a second zone threshold, and restricting the pumping from the second zone when the level of washer fluid within the second zone is below the second zone threshold.

Another example of the foregoing method includes pumping washer fluid from the first zone using first valve that moves from a flow permitting position to a flow restricting position in response to the amount of washer fluid within the first zone falling below the first zone threshold, and pumping washer fluid from the second zone using a second valve that moves from a flow permitting position to a flow restricting position in response to the amount of washer fluid within the second zone falling below the second zone threshold.

In another example of any of the foregoing methods, the first valve floats within washer fluid within the first zone, and the second valve floats within washer fluid within the second zone.

In another example of any of the foregoing methods, the first zone and the second zone are different areas of the washer fluid reservoir. The first zone has a first low point and the second zone has a second low point.

In another example of any of the foregoing methods, the washer fluid reservoir straddles a wheel well of a vehicle.

A washer fluid delivery method according to yet another exemplary aspect of the present disclosure includes, among other things, using a pump to move a washer fluid from a first area of a washer reservoir through a first valve, and to move washer fluid from a second area of the washer fluid tank through a second valve.

Another example of the foregoing method includes depleting the supply of washer fluid within the first area to shut the first valve and block a flow of air through the first valve.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

As needs for washer fluid on a vehicle increase, a size of a washer fluid reservoir can be increased to facilitate carrying more washer fluid on the vehicle. Packaging the washer fluid reservoir of an increased sized can be difficult. The larger washer fluid reservoirs may include more than one zone each having a low point.

This disclosure relates to a washer fluid delivery system that can draw washer fluid from one zone when washer fluid in another of the zones has been depleted. Further, the disclosure details a pump that is used to draw washer fluid from more than one zone.

Figure 1:
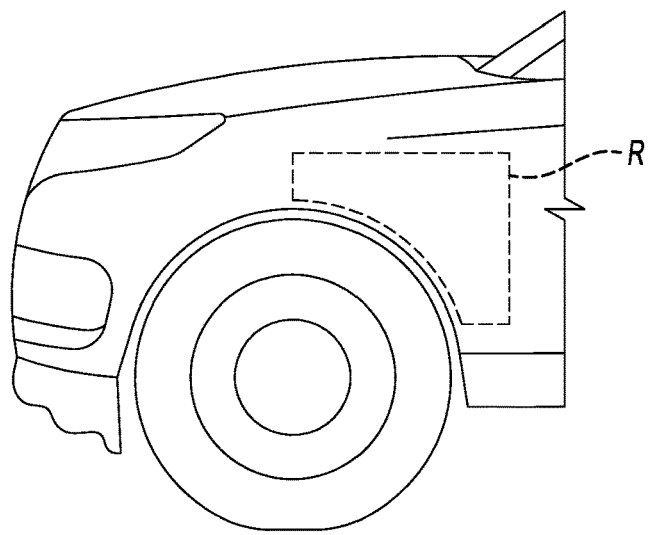
FIG. 1 illustrates a side view of a selected portion of a vehicle incorporating a washer fluid reservoir according to the prior art.
Figure 2:
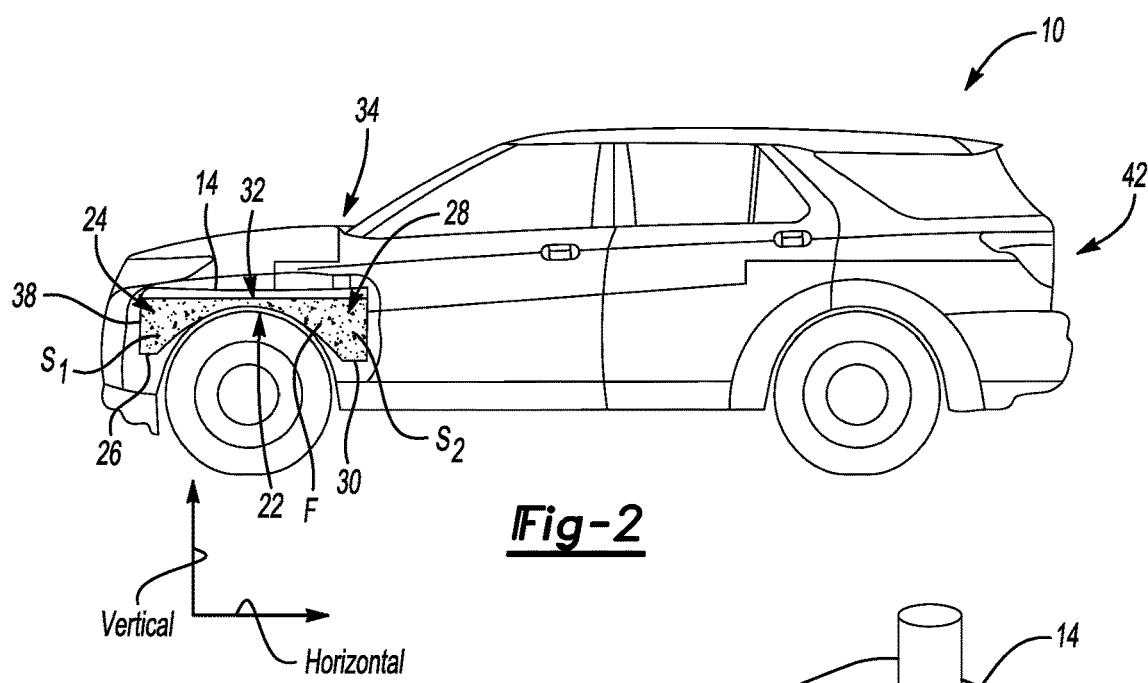
FIG. 2 illustrates a side view of a vehicle incorporating a washer fluid reservoir as part of a washer fluid delivery system according to an exemplary embodiment of the present disclosure.
Figure 3:
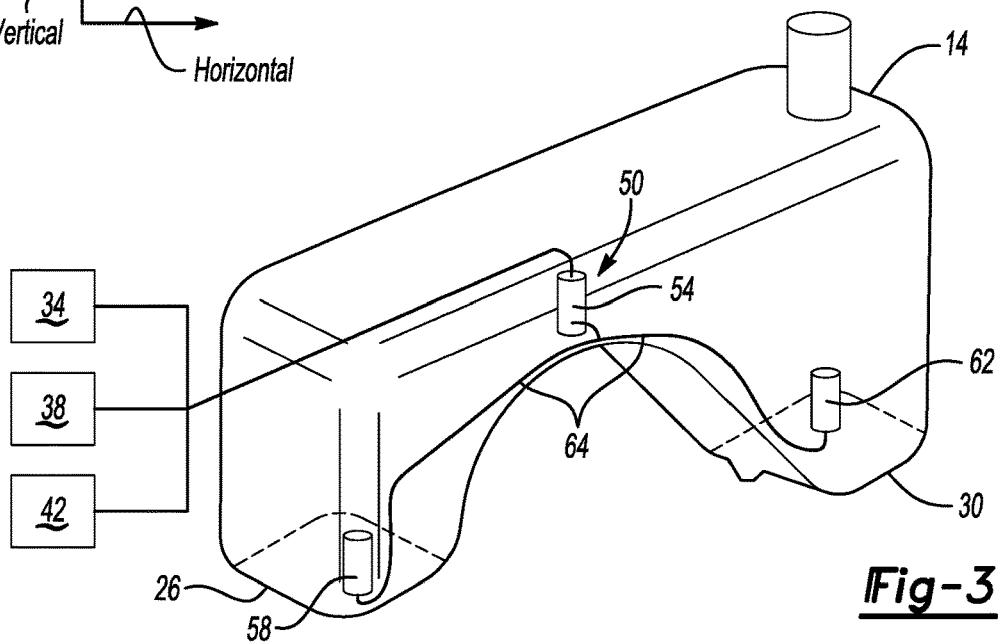
FIG. 3 illustrates a perspective view of the washer fluid reservoir of FIG. 1 along with selected portions of the washer fluid delivery system.

With reference to FIGS. 2 and 3, an exemplary vehicle 10 includes a washer fluid reservoir 14. The washer fluid reservoir 14 spans a wheel well 22 of the vehicle 10. The exemplary washer fluid reservoir 14 can hold more than three gallons of washer fluid in this example. In particular, a capacity of the exemplary washer fluid reservoir 14 is from three to four gallons.

The washer fluid reservoir 14 includes a first zone 24 having a first low point 26. The first zone 24 extends to a position that is forward the wheel well 22. The washer fluid reservoir 14 includes a second zone 28 having a second low point 30. The second zone 28 extends to a position that is aft the wheel well 22.

The washer fluid reservoir 14 further includes a bridging zone 32. The wheel well 22 is vertically beneath the bridging zone 32. The first low point 26 of the first zone 24 and the second low point 30 of the second zone 28 are both vertically beneath a lowest point of the bridging zone 32.

Vertical, for purposes of this disclosure is with reference to ground and the ordinary orientation of the vehicle 10 during operation.

When the washer fluid reservoir 14 is substantially filled with a washer fluid F, the bridging zone 32 fluidly couples the first zone 24 and the second zone 28. As an amount of the washer fluid F within the washer fluid reservoir 14 decreases, a supply $S_1$ of washer fluid F within the first zone 24 is eventually cutoff from a supply $S_2$ of washer fluid F in the second zone 28. That is, when the amount of washer fluid F within the washer fluid reservoir 14 has decreased such that the bridging zone 32 is substantially emptied, the first zone 24 is fluidly decoupled from the second zone 28. Typically, after continuing to use more washer fluid F, the first zone 24 does not run out of washer fluid F as the same time as the second zone 28.

A washer fluid delivery system 50, according to an exemplary aspect of the present disclosure, can draw washer fluid F from both the first zone 24 and the second zone 28. Further, if an amount of the washer fluid F is depleted such that washer fluid F cannot be provided from the first zone 24 or the second zone 28, the washer fluid delivery system 50 will avoid sucking in air.

The washer fluid delivery system 50 can deliver washer fluid F to various areas of the vehicle 10, including, but not limited to, windshield washers 34, a front camera washer 38, and a rear camera washer 42. The washer fluid F can be used to clean these components.

In the exemplary embodiment, the washer fluid delivery system 50 includes a pump 54, a first valve 58, a second valve 62, and fluid hoses 64. The pump 54, the first valve 58, and the second valve 62, and the hoses 64 are disposed within an interior of the washer fluid reservoir 14 in this example. In particular, the example pump 54 is disposed within the bridging zone 32 and vertically above the wheel well 22. In another example, the pump 54 is disposed within the first zone 24 or the second zone 28, or outside the washer fluid reservoir 14.

The first valve 58 is disposed within the first zone 24 of the washer fluid reservoir 14. In the exemplary embodiment, the first valve 58 is a float valve that floats within the washer fluid F within the first zone 24.

The second valve 62 is disposed within the second zone 28 of the washer fluid reservoir 14. In the exemplary embodiment, the second valve 62 floats within the washer fluid F within the second zone 28.

The pump 54 can be operated to draw washer fluid F through the first valve 58, and through the second valve 62. The pump 54 draws the washer fluid F through the first valve 58 and the second valve 62 into the hoses 64. The washer fluid F is then moved to a desired areas of the vehicle 10. The hoses 64 connect the first valve 58 to the pump 54 and the second valve 62 to the pump 54 in this example.

In the exemplary embodiment, the valves 58 and 62 rise and fall with the respective level of washer fluid $S_1$ and $S_2$ within the first zone 24 and the second zone 28. Further, the valves 58 and 62 are shutoff valves that each move back and forth between a flow permitting position and a flow restricting position in response to an amount of washer fluid F within the respective first zone 24 or second zone 28.

In particular, with respect to the first valve 58, when an amount of washer fluid F within the first zone 24 has been depleted such that the first valve 58 will begin to draw air from the first zone 24 rather than washer fluid F, the first valve 58 moves to the flow restricting position to shut off or block a flow of air through the first valve 58. Similarly, with respect to the second valve 62, when an amount of washer fluid F within the second zone 28 has been depleted such that the second valve 62 will begin to drawn air from the second zone 28 rather than washer fluid F, the second valve 62 moves to the flow restricting position to shut off block a flow of air through the second valve 62.

Notably, reducing the amount of washer fluid F within the first zone 24 can cause the first valve 58 to transition from the flow permitting position to the flow restricting position, and increasing the amount of washer fluid F within the first zone 24 can cause the first valve 58 to transition from the flow restricting position to the flow permitting position. Also, reducing the amount of washer fluid F within the second zone 28 can cause the second valve 62 to transition from the flow permitting position to the flow restricting position, and increasing the amount of washer fluid F within the second zone 28 can cause the second valve 62 to transition from the flow restricting position to the flow permitting position. The first valve 58 and the second valve 62 thus move between the respective flow restricting and flow permitting positions in response to amount of washer fluid F.

Figure 4:
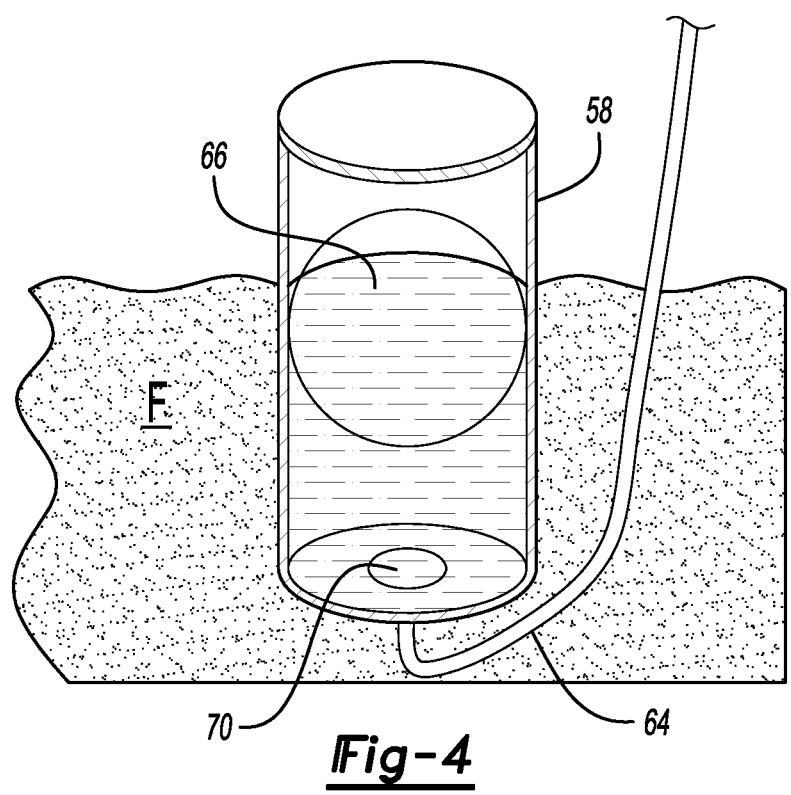
FIG. 4 illustrates a section view of a valve from the washer fluid delivery system of FIG. 3 when the valve is in a flow permitting position.

FIG. 4 shows a section view of the first valve 58 when the washer fluid F extends above the first valve 58. The level of the washer fluid F in FIG. 4 can be considered a level above a threshold level.

The first valve 58 includes a floatable member, here a ball 66, that has a lower density than the washer fluid F, say a density less than 1.00. The ball 66 can be a plastic ball that floats in water, for example. When the washer fluid F is deep enough (i.e., above the threshold level), the ball 66 floats in the washer fluid F to move away from an inlet 70 to the hose 64. When the ball 66 is moved away from the inlet 70, the pump 54 can operate to draw fluid through the first valve 58 to the hose 64.

Figure 5:
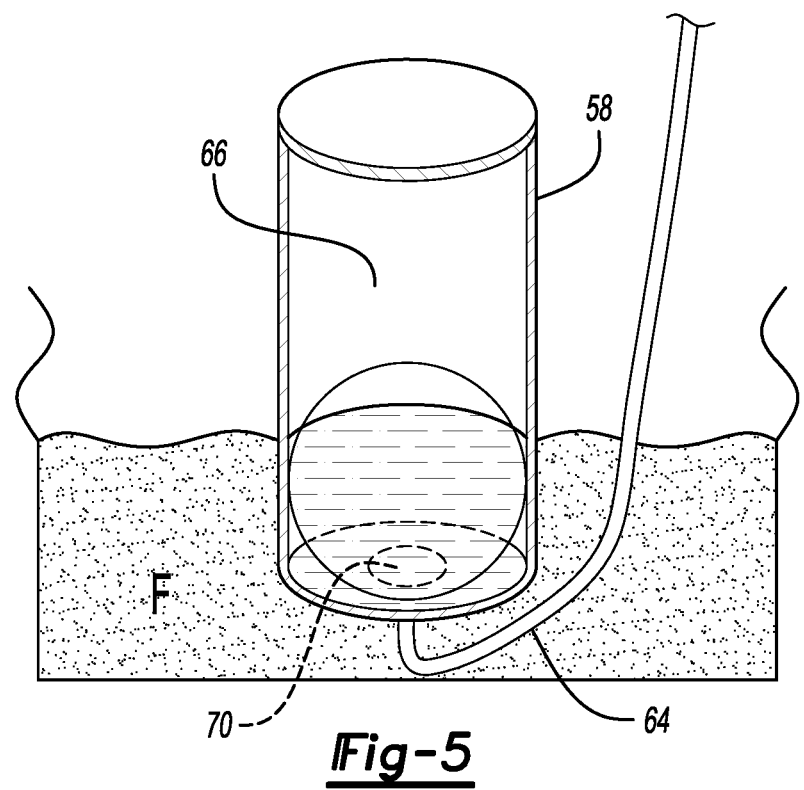
FIG. 5 illustrates the valve of FIG. 4 in a flow restricting position.

As shown in FIG. 5, when the level of washer fluid F is shallower (i.e., below the threshold level), the washer fluid F no longer floats the ball 66 away from the inlet 70. Instead, the ball 66 falls to a position where the ball 66 covers the inlet 70 thereby blocking the flow of air through the inlet 70 into the hose 64. Thus, even though the first zone 24 may have been emptied of washer fluid F, the pump 54 can continue to draw washer fluid F from the second zone 28 without mixing in significant amounts of air.

In the position of FIG. 5, the pump 54 can continue to operate and draw washer fluid from the second zone 28 without drawing air from the first zone 24 of the washer fluid reservoir 14.

The operation of the valve described in connection with FIGS. 4 and 5 can apply to the second valve 62. That is, as the supply of washer fluid F within the second zone 28 of the washer fluid reservoir 14 is depleted, the second valve 62 transitions to a shutoff position to prevent air from moving through the second valve 62 into the hose 64. Shutting off the flow of air closes the shutoff valve 62. The pump 54 then can continue to draw fluid from the first zone 24 of the washer fluid reservoir 14.

Features of the disclosed examples includes a single pump used to draw washer fluid from different zones of a washer fluid reservoir. The single pump can help to reduce costs when compared to systems using more than one pump. The disclosed system can also help to block the pumping of air, which, if permitted, can lead to potentially inefficient washing of components of the vehicle.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A washer fluid delivery system, comprising:
   a washer fluid reservoir having a first zone with a first low point and a second zone with a second low point;
   a first valve disposed in the first zone, the first valve moveable back and forth between a flow permitting position and a flow restricting position in response to an amount of washer fluid within the first zone;
   a second valve disposed in the second zone, the second valve moveable back and forth between a flow permitting position and a flow restricting position in response to an amount of washer fluid within the second zone;
   a pump that operates to draw a washer fluid from the first zone through the first valve when the first valve is in the flow permitting position, and to draw a washer fluid from the second zone through the second valve when the second valve is the flow permitting position; and
   a vehicle, wherein the first zone extends to a position that is forward a wheel well of a vehicle and the second zone extends to a position that is aft the wheel well of the vehicle.

2. The washer fluid delivery system of claim 1, wherein washer fluid in the first zone is fluidly coupled to washer fluid in the second zone when the washer fluid reservoir has a first amount of washer fluid, wherein washer fluid in the first zone is fluidly decoupled from washer fluid in the second zone when the washer fluid has a second amount of washer fluid that is less than the first amount of washer fluid.

3. The washer fluid delivery system of claim 1, wherein the first valve is a first shutoff valve, wherein the second valve is a second shutoff valve.

4. The washer fluid delivery system of claim 1, wherein the first valve in the flow permitting position permits a flow of the washer fluid through the first valve, and the first valve in the flow restricting position restricts a flow of air through the first valve, wherein the second valve in the flow permitting position permits a flow of the washer fluid through the second valve, and the second valve in the flow restricting position restricts a flow of air through the second valve.

5. The washer fluid delivery system of claim 1, wherein the pump is disposed within the washer fluid reservoir.

6. The washer fluid delivery system of claim 1, wherein the first valve is configured to float in washer fluid within the first zone, wherein the second valve is configured to float in washer fluid within the second zone.

7. The washer fluid delivery system of claim 1, further comprising a first hose connecting the first valve to the pump, and a second hose connecting the second valve to the pump.

8. The washer fluid delivery system of claim 7, wherein the first valve includes a first floatable member that permits flow of washer fluid through the first valve to the first hose when a first amount of washer fluid is held within the first zone, the first floatable member restricting a flow of washer fluid through the first valve to the first hose when a second amount of washer fluid is held within the first zone, the first amount greater than the second amount.

9. The washer fluid delivery system of claim 1, further comprising a bridging zone of the washer fluid reservoir, wherein the bridging zone fluidly couples the first zone and the second zone when the washer fluid reservoir has an amount of washer fluid greater than a threshold amount.

10. The washer fluid delivery system of claim 9, wherein the first low point of the first zone, and the second low point of the second zone both extend vertically beneath a lowest point of the bridging zone.

11. The washer fluid delivery system of claim 10, further comprising a vehicle, wherein the first zone is forward a wheel well of a vehicle and the second zone is aft the wheel well of the vehicle, wherein the bridging zone is vertically above the wheel well.

12. The washer fluid delivery system of claim 11, wherein the pump is disposed within the bridging zone.

13. A washer fluid delivery method, comprising:
pumping washer fluid from a first zone of a washer fluid reservoir when a level of washer fluid within the first zone is above a first zone threshold;
restricting the pumping from the first zone when the level of washer fluid within the first zone is below the first zone threshold;
pumping washer fluid from a second zone of the washer fluid reservoir when a level of washer fluid within the second zone is above a second zone threshold; and
restricting the pumping from the second zone when the level of washer fluid within the second zone is below the second zone threshold,
wherein the washer fluid reservoir straddles a wheel well of a vehicle.

14. The method of claim 13, wherein the first zone and the second zone are different areas of the washer fluid reservoir, wherein the first zone has a first low point and the second zone has a second low point.

15. The method of claim 13, further comprising pumping washer fluid from the first zone using first valve that moves from a flow permitting position to a flow restricting position in response to the amount of washer fluid within the first zone falling below the first zone threshold, and pumping washer fluid from the second zone using a second valve that moves from a flow permitting position to a flow restricting position in response to the amount of washer fluid within the second zone falling below the second zone threshold.

16. The method of claim 15, wherein the first valve floats within washer fluid within the first zone, wherein the second valve floats within washer fluid within the second zone.

17. A washer fluid delivery method, comprising:
using a pump to move a washer fluid from a first area of a washer fluid reservoir through a first valve, and to move washer fluid from a second area of the washer fluid reservoir through a second valve, the first area fluidly coupled to the second area through a bridging zone of the washer fluid reservoir,
wherein the washer fluid reservoir straddles a wheel well of a vehicle.

18. The method of claim 17, further comprising depleting a supply of washer fluid within the first area to shut the first valve and block a flow of air through the first valve.

* * * * *